United States Patent
Wozniak et al.

(10) Patent No.: US 10,484,861 B2
(45) Date of Patent: Nov. 19, 2019

(54) ELECTRONIC DEVICE COMPRISING A SECURE MODULE SUPPORTING A MODE FOR THE LOCAL MANAGEMENT OF THE CONFIGURATION OF A SUBSCRIBER PROFILE

(71) Applicant: IDEMIA FRANCE, Colombes (FR)

(72) Inventors: Tomasz Wozniak, Colombes (FR); Alexis Michel, Colombes (FR)

(73) Assignee: IDEMIA France, Colombes (FR)

( * ) Notice: Subject to any disclaimer, the term of this patent is extended or adjusted under 35 U.S.C. 154(b) by 0 days.

(21) Appl. No.: 15/768,430

(22) PCT Filed: Oct. 13, 2016

(86) PCT No.: PCT/FR2016/052652
§ 371 (c)(1),
(2) Date: Apr. 13, 2018

(87) PCT Pub. No.: WO2017/064430
PCT Pub. Date: Apr. 20, 2017

(65) Prior Publication Data
US 2018/0324579 A1    Nov. 8, 2018

(30) Foreign Application Priority Data

Oct. 15, 2015 (FR) .................................... 15 59820

(51) Int. Cl.
*H04W 12/08* (2009.01)
*H04W 8/18* (2009.01)
(Continued)

(52) U.S. Cl.
CPC ............. *H04W 8/183* (2013.01); *H04L 67/34* (2013.01); *H04W 4/50* (2018.02); *H04W 8/205* (2013.01);
(Continued)

(58) Field of Classification Search
CPC ...... H04W 76/10; H04W 48/08; H04W 8/183
(Continued)

(56) References Cited

U.S. PATENT DOCUMENTS 8,031,871 B2    10/2011   Beaudou et al.
9,426,731 B1 *   8/2016   Uy ........................ H04W 48/18
(Continued)

FOREIGN PATENT DOCUMENTS

EP    1 483 930 B1    9/2011
FR    2 837 009 A1    9/2003

OTHER PUBLICATIONS

International Search Report, dated Jan. 12, 2017, from corresponding PCT application No. PCT/FR2016/052652.

*Primary Examiner* — Kiet M Doan
(74) *Attorney, Agent, or Firm* — Young & Thompson

(57) ABSTRACT

In the field of electronic devices, there is disclosed a secure module for housing at least one subscriber profile and an interface allowing the local configuration of a profile. The secure module also includes an activation agent including a unit for detection of a mode of local management of the profile for authorising and/or prohibiting the processing of the local configuration requests by a local manager according to the result of the detection. Also disclosed is a detachable integrated circuit cards or secure elements soldered into the device communicating via a mobile telecommunication network.

20 Claims, 5 Drawing Sheets

(51) Int. Cl.
    *H04W 4/50*           (2018.01)
    *H04L 29/08*         (2006.01)
    *H04W 8/20*           (2009.01)
    *H04W 12/06*         (2009.01)
    *H04W 12/00*         (2009.01)

(52) U.S. Cl.
    CPC ....... *H04W 12/0023* (2019.01); *H04W 12/06* (2013.01); *H04W 12/08* (2013.01)

(58) Field of Classification Search
    USPC ..... 455/411, 558, 422.1, 419, 466; 370/338, 370/336
    See application file for complete search history.

(56) References Cited

U.S. PATENT DOCUMENTS

| | | |
|---|---|---|
| 2008/0009317 A1 | 1/2008 | Lasser et al. |
| 2009/0168701 A1* | 7/2009 | White ................ H04L 12/5692 370/328 |
| 2011/0306318 A1 | 12/2011 | Rodgers et al. |
| 2014/0031012 A1 | 1/2014 | Park et al. |
| 2016/0050557 A1* | 2/2016 | Park ..................... H04W 12/04 455/419 |
| 2017/0215063 A1* | 7/2017 | Wozniac ............... H04W 8/183 |

\* cited by examiner

ELECTRONIC DEVICE COMPRISING A SECURE MODULE SUPPORTING A MODE FOR THE LOCAL MANAGEMENT OF THE CONFIGURATION OF A SUBSCRIBER PROFILE

The field of the invention concerns an electronic device comprising a secure module, of the smart card type, for example, intended to host at least one mobile communication network subscriber profile.

BACKGROUND OF THE INVENTION

The secure module of an electronic device is commonly referred to as the UICC (Universal Integrated Circuit Card), eUICC (Embedded Universal Integrated Circuit Card) or eSE (Embedded Secure Element). These secure modules are of removable smart card type or soldered into the electronic device of the user.

In a so-called M2M (Machine to Machine) architecture, a provisioning profile is loaded during the manufacture of the secure module or the electronic device after which the or each subscriber profile is provisioned by a remote server by means of a secure communication network using data encryption and decryption operations.

For example, the profile of a subscriber allowing the use of a mobile communication network service can be provisioned and configured remotely. The GSMA technical specification entitled "Remote Provisioning Architecture for Embedded UICC", version 3.0 of 30 Jun. 2015 (SGP-02-V3-0), is aimed at providing a framework for the development of these solutions.

Moreover, there is known for example the patent document EP1483930B1 describing a solution enabling the updating of a secure module. The provisioning and configuration actions are initiated by a remote server.

Now, there is also the aim to propose electronic devices authorizing the user or an application residing in the electronic device or in the secure module locally to initiate the provisioning of a subscriber profile and locally to configure that profile. The Profile Management functions are then also transmitted by means of an interface of the electronic device communicating with the secure module. The interface has the function of transmitting, to a local manager of the local requests for configuration of the secure module, local configuration requests, initiated for example by the user or by an application that can be situated, for example, in the electronic device or in the secure module, from a profile management software application operating in the software environment of the electronic device.

By local profile management or local profile management mode is meant the configuration functions of a profile initiated or coming from the electronic device (via the human-machine interface or an application) hosting the secure module or initiated or coming from the secure module itself (via an application), as distinct from an architecture in which the profile management functions come from a remote server.

SUMMARY OF THE INVENTION

An objective of the invention is to ensure the security of local profile configuration actions. Another objective of the invention is to enable cohabitation of a remote profile management mode and a local management mode.

To be more precise, the invention concerns an electronic device comprising a secure module intended to host at least one mobile communication network subscriber profile and a first interface for at least the transmission of local profile configuration requests to the secure module. According to the invention the device comprises a local manager for at least the reception of local profile configuration requests coming from the first interface and also an activation agent comprising means for detection of a local profile management mode to authorize and/or to prohibit the local manager to process/from processing the local configuration requests as a function of the result of the detection.

In a variant embodiment, the local requests are requests for activation of a subscriber profile, requests for deactivation of a subscriber profile, and requests for deletion of a subscriber profile.

In a variant embodiment, the detection means comprise means for verifying, at the time of provisioning the profile, that this provisioning of the profile originates from the first interface to determine the result of the detection.

In a variant embodiment, the secure module also comprises a second interface communicating with a remote server for at least the reception of remote profile configuration requests and the detection means comprise means for determining at least one secure radiofrequency transport protocol that has been executed by the second interface at the time of the provision of the profile to determine the result of the detection.

In a variant embodiment, the secure radiofrequency transport protocol is of the SCP80 or SCP81 type.

In a variant embodiment, the detection means also comprise means for verifying that the second interface has received an instruction to activate the local profile management mode coming from the remote server to determine the result of the detection.

In a variant embodiment, the first interface comprises means for notifying the remote server to activate the local profile management mode.

In a variant embodiment, the activation agent comprises means for authorizing and/or prohibiting the local manager to process/from processing some or all of the local configuration requests coming from the first interface. For example, the activation agent comprises means for authorizing the local manager to process local requests for activation and deactivation of a subscriber profile and to prohibit the local manager from processing local requests for deletion of a subscriber profile.

There is also provided in accordance with the invention a method of activation of a local management mode of requests for configuration of a subscriber profile for an electronic device comprising a secure module adapted to host at least one subscriber profile. According to the invention the method comprises a step of detection of a local profile management mode by detection means of an activation agent of the secure module, followed by a step of authorizing or prohibiting a local manager of the secure module to process/from processing local configuration requests coming from a first interface of the electronic device as a function of the result of the detection.

According to a variant embodiment, the detection step comprises the verification that, at the time of provisioning the profile, that this provisioning of the profile originates from the first interface to determine the result of the detection.

According to a variant embodiment, the detection step also comprises the determination of at least one secure radiofrequency transport protocol that has been executed by a second interface of the secure module to determine the result of the detection.

According to a variant embodiment, the secure radiofrequency transport protocol is of the SCP80 or SCP81 type.

According to a variant embodiment, the detection step also comprises the verification of the reception by the second interface of an instruction for activation of the local profile management mode coming from a remote server to determine the result of the detection.

According to a variant embodiment, the method also comprises a step of notification by the interface of the remote server to activate the local profile management mode.

According to a variant embodiment, the method also comprises a step of authorizing or prohibiting the local manager to process/from processing some or all of the local configuration requests coming from the first interface. For example, the activation agent authorizes the local manager to process local requests for activation and deactivation of a subscriber profile and prohibits the local manager from processing local requests for deletion of a subscriber profile.

In a variant embodiment of the method, the local configuration requests are requests for activation of the subscriber profile, requests for deactivation of the subscriber profile and requests for deletion of the subscriber profile.

There is provided in accordance with the invention, a computer program product storing code that can be executed by an electronic device comprising a secure module intended to host at least one mobile communication network subscriber profile for the implementation of the method in accordance with any one of the preceding embodiments.

Thanks to invention, the activation of the local subscriber profile configuration management mode is secure. The secure module is provided with detection means to authorize or to prohibit the processing of local configuration requests. Moreover, the invention enables an operator to retain control over the local profile configuration management mode, in particular by allowing the authorization or the prohibition of specific requests selected by the operator. Moreover, the detection of the local management mode is integrated into the functions of the secure module, thus making it possible to ensure it is secure.

BRIEF DESCRIPTION OF THE DRAWINGS

Other features and advantages of the present invention will become more clearly apparent on reading the following detailed description of embodiments of the invention given by way of nonlimiting example and illustrated by the appended drawings, in which.

DETAILED DESCRIPTION OF THE PREFERRED EMBODIMENTS

Figure 1:
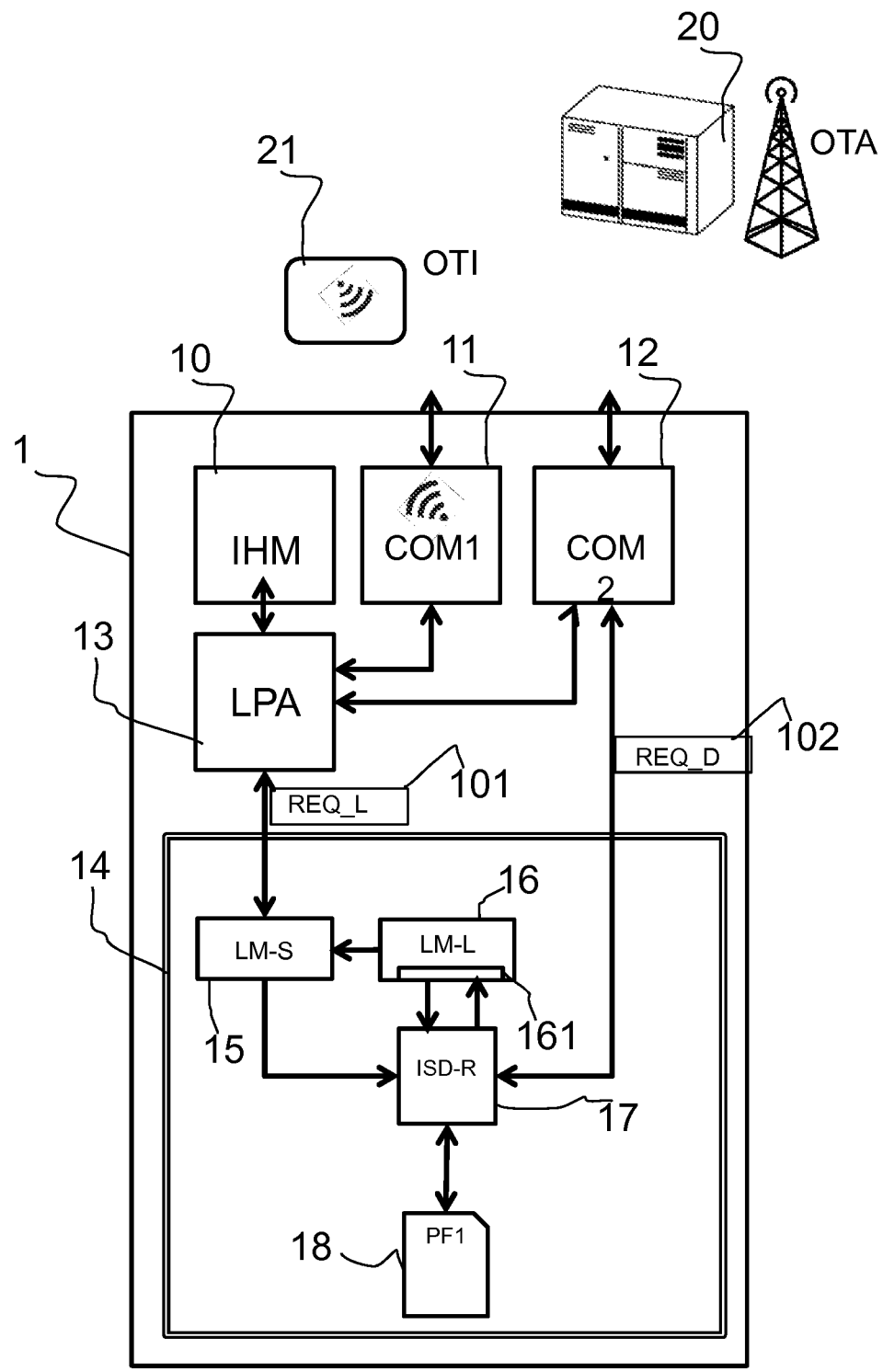
FIG. 1 represents an electronic device of a user comprising a secure module comprising a local manager of local configuration requests.

The invention concerns an electronic device of a user subscribing to a mobile communication network service of the GSM (Global System for Mobile communications), CDMA (Code Division Multiple Access) or WIFI type, or more generally any short-range, medium-range and long-range communication network. The electronic device can be a portable device of the mobile telephone, tablet, watch, computer, car or fixed electronic device type utilizing a mobile telephone network for its functions, for example a remote controller, a dispenser or any machine that can be supervised remotely in an M2M type architecture.

To these ends, the electronic device comprises a secure module intended to host one or more subscriber profiles to authenticate itself to one or more mobile communication networks. The subscriber profile is configured remotely by the secure communication offered by the mobile communication network.

Moreover, in the context of the invention, the aim is to propose an electronic device the subscriber profile of which can be provisioned and configured locally via an interface of the electronic device communicating with a local manager of the secure module. It is necessary to secure the local manager and to ensure cooperation between the local manager and the remote server usually executing the provisioning and configuration actions. The invention proposes an electronic device comprising a secure module adapted to operate in a local profile management mode.

A local management mode operates by means of functions for configuring the subscriber profile and local requests that are initiated by the user of the electronic device, for example by means of an onboard application for configuration of a profile that can be executed by the user via a human-machine interface of the electronic device 1. The local management mode enables a user to configure a subscriber profile directly from local requests that the user has initiated on their electronic device. By way of nonlimiting example, the local requests are requests for activation of a profile (EnableProfile), requests for deactivation of a profile (DisableProfile) and requests for deletion of a profile (DeleteProfile).

The remote subscriber profile management mode is different because a remote server initiates remote configuration requests. Remote configuration requests are initiated by a function of the remote server and transmitted to the secure module via the mobile telephone communication network. The remote configuration requests are secured by encryption and radiofrequency secure transport protocols. For example, these remote requests correspond to the requests listed under head 4.1 of the aforementioned GSMA standard describing the functions existing between a remote server and the secure module for the management of a profile. By way of nonlimiting example, the remote requests of a profile are requests for creation of a profile (CreateISDP), requests for activation of a profile (EnableProfile), requests for deactivation of a profile (DisableProfile), requests for deletion of a profile (DeleteProfile), requests for interrogation of the status of a profile (eUICCCapabilityAudit), mutual authentication requests for the exchange of a secret (establishIS-DRKeySet), requests for key deletion (FinaliseISDRhandover).

To be more precise, FIG. 1 represents the electronic device 1 of a user comprising a secure module 14 that can host one or more subscriber profiles 18. The secure module 14 is an integrated circuit of removable SIM (Subscriber Identification Module) type or an integrated circuit soldered into the electronic device 1, commonly referred to as an eSE. The electronic device 1 also comprises communication means 12 for exchanging data over a radiofrequency communication network, for example of GSM or CDMA type. The communication means 12 enable exchanges of voice, data, mobile Internet or SMS (short message service) type, for example.

To be more precise, a subscriber profile 18 comprises, inter alia, the connection parameters and cryptographic means for authenticating it and accessing a mobile telephone network, a file system, groups of cryptographic keys (keysets), and network access applications (NAA). In particular, the subscriber profile enables the use of private cryptographic keys and network applications stored in the secure module 14 to authenticate itself to an authentication server of the telephone network and thus to be authorized to utilize the resources of the telecommunication network. Moreover, the cryptographic means comprise functions executing authentication algorithms utilized for the authentication process as well as data encryption and decryption algorithms for executing the secure communication via the mobile telephone network.

The electronic device 1 comprises a first interface 13 for at least the transmission of local profile configuration requests 101 to the secure module 14. The local configuration requests 101 are the requests/functions executing the management functions of the profile 18, such as for example the functions for activation, deactivation and deletion of a profile. These local requests are generated by the electronic device 1, for example by a request of the user via the human-machine interface 10 and the configuration interface 13.

It will be noted that the local requests 101 for configuration of a profile 18 can operate the functions equivalent to the remote PROFILE MANAGEMENT requests of the aforementioned GSMA technical specification, such as for example the remote requests named EnableProfile, DisableProfile and DeleteProfile. Differing from the GSMA specification, the local configuration requests 101 are generated by the electronic device 1, and not by a remote server 20.

The first interface 13 is an application executed by the software environment of the electronic device 1 and preferably also has the function of provisioning a subscriber profile 18 to the secure module 14 in a provisioning mode initiated locally. In this provisioning mode initiated locally, the interface 13 comprises means for transmitting a request to provision a subscriber profile to a remote provider server 20 via the communication means 11 or 12. The interface 13 also comprises means for receiving the script for installation of a subscriber profile received via the communication means 11 or 12. There may be envisaged access to a communication network 21 other than a mobile telephone network via which the profile can be provisioned in the local mode. The communication network 21 is a network of an Internet service provider (cable or optic fiber for example) via WIFI, Ethernet or optic fiber type communication, for example.

It will be noted that in the local subscriber profile management mode the local configuration requests 101, when they are received from the outside via the communication means 11 or the communication means 12, are processed by the interface 13 (for example for decryption and temporary storage operations) in order to be executable by the secure module 14.

Moreover, in the context of the invention, the secure module 14 also comprises a local manager 15 for at least the reception of local profile configuration requests 101 coming from the first interface 13 and also an activation agent 16 comprising means 161 for detection of a local profile management mode for authorizing and prohibiting the local manager 15 to process/from processing the local configuration requests 101 as a function of the result of the detection. To be more precise, the activation agent 16 authorizes the local manager 15 to process the local requests coming from the first interface 13 if the result of the detection indicates that the local management mode has been detected. Otherwise, the activation agent 16 prohibits the local manager 15 from processing the local requests coming from the first interface 13 if the result of the detection indicates that the local management mode has not been detected. It will be noted that the secure module 14 is able to receive the local configuration requests 101 and a subscriber profile 18 the provisioning of which is initiated by the user by means of the interface 13.

Moreover, the secure module 14 comprises a second interface 17 able to communicate with the remote server 20 for the reception of a subscriber profile 18 and remote requests 102 for configuration of the profile 18. The second interface 17 is a means for routing a subscriber profile and remote configuration requests generated by the remote server 20. The interface 17 of the secure module 14 executes in particular encryption-decryption operations conforming to the so-called Secure Channel Protocol secure transport protocols, for example SCP03 or SCP03t, SCP80 and SCP81. Once the data stream has been decrypted, it is processed by the secure module 14 to execute the script for installation of the profile and the remote configuration requests. The interface 17 of the secure module 14 receives a data stream via GSM or CDMA communication means 12 of the electronic device 1.

For example, the encryption-decryption means of the interface 17 of the secure module conform to the technical specification SCP03 described in the document "Global Platform Card Technology—Secure Channel Protocol 03—Card Specification V2.2 Amendment D", version 1.1.1, the technical specification SCP03t described in the document "Remote Provisioning Architecture for Embedded UICC Technical Specification", version 3.0, the technical specification SCP80 notably used in the document ETSI TS 102 225 v12.0.0 "Secured packet structure for UICC based applications" and the technical specification SCP081 "Remote Application Management over http—Card Specification V2.2-Amendment B"—version 1.1.3.

It can also be envisaged that the interface 13 of the electronic device 1 also operates decryption operations conforming to the SCP03, SCP80 or SCP81 secure transport protocol before transmission to the local manager 15 of the secure module 14.

It will be noted that the interface 17 is routinely designated by the abbreviation ISD-R (Issuer Security Domain Root) in the aforementioned GSMA standard and is designed to cooperate with an interface of the remote server 20 in charge of the encryption of the data stream (for example script for installation of a subscriber profile, remote requests 102 in the form of APDU (Application Protocol Data Unit) commands).

Moreover, in the context of the invention, if the local manager 15 is authorized to transmit local requests, the interface 17 is able to receive from the local manager 15 local requests 101 received via the interface 13 of the electronic device 1. The interface 17 then processes the local requests. Accordingly, by processing of the local requests by the local manager 15 is meant in particular that the local manager 15 is in charge of transmitting the local configuration requests 101 to the second interface 17 as a function of the result of the detection of the local management mode.

The interface 17 of the secure module can also receive from the interface 13 of the electronic device 1 a script for installation of a subscriber profile in the provision mode initiated locally. In this case, the installation script and the local configuration requests have been processed and decrypted in whole or in part beforehand by the interface 13.

It will be noted that the remote requests 102 for configuration of a profile can operate the so-called PROFILE MANAGEMENT functions of the aforementioned GSMA technical specification, such as for example the remote requests EnableProfile, DisableProfile and DeleteProfile.

In a first variant, the detection means 161 comprise means for verifying if at the time of provisioning the profile originates from the first interface 13 to determine the result of the detection. Moreover, the detection means 161 comprise means for determining at least one radiofrequency secure transport protocol that has been executed by the second interface 17 at the time of provisioning the profile to determine the result of the detection. For example, the detection means determine if the secure transport protocol is of SCP81, SCP80 type, or any radiofrequency secure transport protocol for a telecommunication network. If the result of the detection indicates that a radiofrequency secure transport protocol has been detected, the activation agent 16 prohibits the local manager 15 from processing the local requests 101, i.e. prohibits the transmission of the local configuration requests 101 to the second interface 17. Otherwise, the local manager 15 is authorized, by the activation agent 16, to transmit the local configuration requests 101 to the second interface 17.

In a second variant, in order to determine the result of the detection, the detection means 161 also comprise means for verifying if an instruction for activation of the local profile management mode coming from the remote server 20 has been received. If the result of the detection indicates that an instruction of this kind has been received, the activation agent 16 authorizes the local manager 15 to transmit the local configuration requests 101 to the second interface 17. Otherwise, the local manager 15 prohibits the transmission of the local configuration requests 101 to the second interface 17. The remote server 20 is necessarily notified of the compatibility of the electronic device 1 and the secure module 14 with the local configuration management mode. To this end, a first approach consists in a notification sent to the server by the device in order to acquaint it with information as to support and compatibility of the security module with local management. For example, this detection mode is operative when the secure module is inserted for the first time into the electronic device 1 or if the user wishes to activate local management via the human-machine interface. Another way to proceed can be effected via a request from the server to the security module via the electronic device for interrogation of its capabilities with regard to management of the local management mode. Following the exchange between the server and the secure module, if it proves that local management is supported, then the server will activate the local management mode by sending an activation command to the secure module and more particularly to the interface 17. For example, this mode can be operative when the remote server 20 is authenticated for the first time to the secure module 14.

The detection means 161 is a software function of the activation agent 16 adapted to receive a notification or adapted to operate exchanges of request and response type with the interface 17 to detect the local management mode in accordance with the first or second detection variant.

It is envisaged that the electronic device 1 also comprises means for notifying the remote server 20 to activate the local profile management mode, in particular if it detects that the secure module comprises a local manager 15 or information or a flag indicates it in the service table of a profile.

It will be noted that either or both of the first and second variant of the detection of the local management mode can be executed by the activation agent 16.

There is further provision for the activation agent 16 to comprise means for authorizing and prohibiting the local manager 15 to transmit/from transmitting to the second interface 17 some or all of the local configuration requests received by the first interface 13. For example, the activation agent 16 is adapted on the one hand to authorize the local manager 15 to process a local activation and deactivation request for a subscriber profile 18 and on the other hand to prohibit the local manager 15 from processing a local request for deletion of the profile. In particular, this configuration can be required by a mobile telephone operator that does not want deletion of the profile by the user.

Of course, the person skilled in the art can envisage other software distributions or architectures of the functions executed by the activation agent 16, the local manager 15, the first interface 13 and the second interface 17 between the electronic device 1 and the secure module 14 without departing from the scope of the invention. The person skilled in the art can envisage other software distributions or architectures that guarantee a sufficient level of security for the protection of the subscriber profile and the functioning of the local management mode.

It will be noted that the remote server 20 is a remote electronic entity operated by a mobile telephone operator that is the proprietor of the subscriber profile or profiles stored in the secure module 14. The remote server 20 comprises a function of data preparation for the installation of subscriber profiles and for the execution of configuration requests by the secure module. According to the aforementioned GSMA technical specification, the data preparation function is designated SM-DP (Subscription Manager Data Preparation). The remote server 20 also comprises a function for routing data to the interface 17 of the secure module that operates the encryption of the radiofrequency communications (for example SCP80 and SCP81) and the transmitted data (for example SCP03 or SCP03t). According to the aforementioned GSMA technical specification, the data routing function is designated SM-SR (Subscription Manager Secure Routing).

Figure 2A:
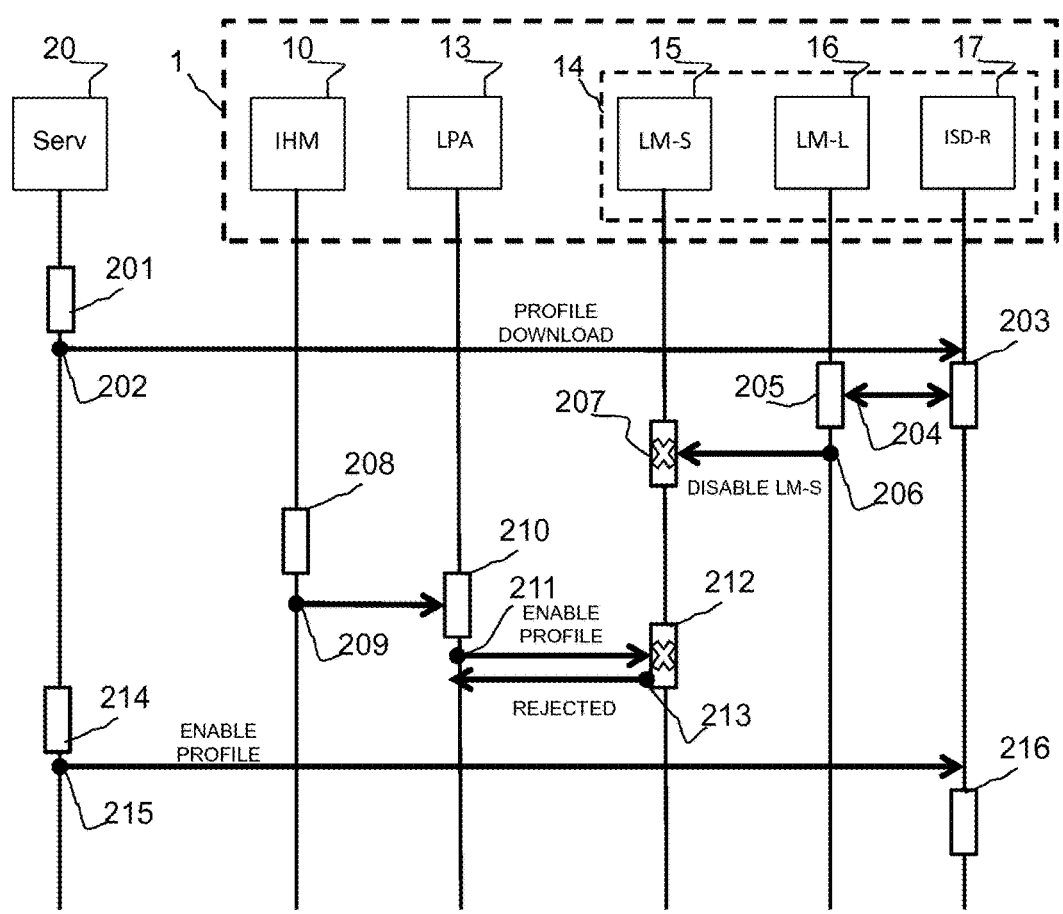
FIG. 2A represents a first variant of the activation method of the local manager of the secure module according to the invention executing detection of the local management mode at the time of remote provisioning of a profile executed conventionally; in this situation the local manager is not activated.

FIG. 2A represents a first situation of operation of the deactivation method of the local manager 15. The first situation corresponds to provisioning of a profile coming directly from a remote server 20 to the interface 17 via the radiofrequency mobile telephone network and for which the activation agent 16 prohibits the local manager 15 from processing the local requests.

In an initial step 201, the remote server 20 prepares a script for installation of a subscriber profile and encrypts the data stream, for example using radiofrequency secure transport protocol encryption conforming to the SCP80 or SCP81 standard.

In a step 202, the script for installation of the profile is transmitted to the interface 17 of the secure module via the mobile communication network encrypted in accordance with a radiofrequency secure transport protocol. After this, in a step 203, the script for installation of the profile is received and processed by the interface 17. During this step, the decryption operations conforming to the radiofrequency secure transport protocol of SCP80 or SCP81 type are executed.

In parallel with this, the detection means 161 of the activation agent 16 execute a step 205 of detection of the local management mode of the provisioned profile. In this embodiment, the detection means 161 on request or on reception of a notification from the interface 17 are informed that decryption operations conforming to a radiofrequency secure transport protocol are executed. Exchanges of information 204 can take place between the interface 17 and the activation agent 16 to perform the detection and to determine the result of the detection. In this case, the result of the detection indicates that the local management mode has not been detected.

It will be noted that at this stage of the process the installed subscriber profile has not been activated. It is in a state awaiting activation.

In this situation, the activation agent 16 detects remote provisioning of the profile because the result of the detection does not indicate a local management mode, and in a step 206 transmits to the local manager 15 an instruction to prohibit processing of the local configuration requests 101. In a step 207, the local manager 15 is commanded to prohibit the processing of the local configuration requests 101, in particular their transmission to the interface 17.

It is then assumed that in a step 208 the user executes an action via the human-machine interface of the electronic device to activate the subscriber profile themselves. In a step 209, the activation instruction is transmitted to the interface 13 which in a step 210 generates the local activation request. In a step 211, the request for local activation of the profile is transmitted to the local manager 15. In the step 212, this local activation request is rejected, because the local manager 15 is prohibited from transmitting the local configuration requests 101 to the second interface 17. In a step 213, a notification of rejection is transmitted to the interface 13 of the electronic device 1 which then preferably informs the user via the human-machine interface.

It will be noted that, afterwards, in a step 214, the remote server 20 generates a remote request for activation of the profile, in a step 215, transmits it to the interface 17 of the secure module, and then, in a step 216, the interface 17 processes the remote request for activation of the profile. It can be envisaged that the remote server 20 has been informed via an Internet service of the wish of the user to activate the profile following the rejection of local activation.

Figure 2B:
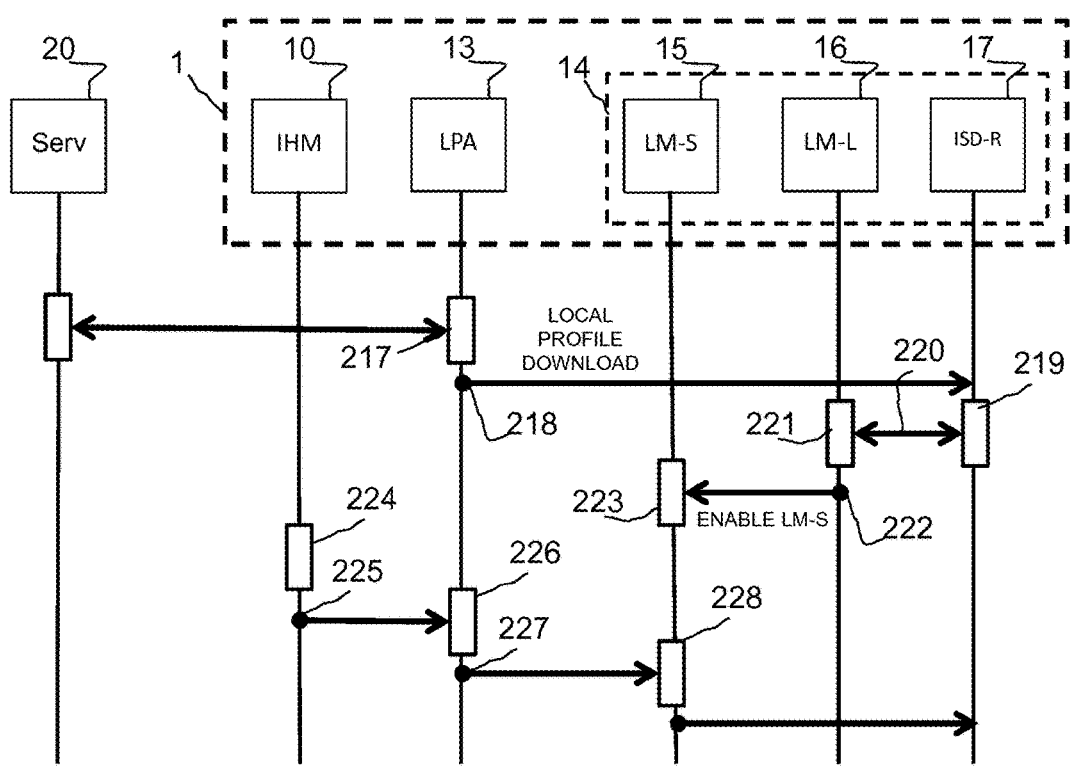
FIG. 2B represents a first variant of the activation method of the local manager of the secure module according to the invention executing detection of the local management mode at the time of provisioning a profile initiated locally; in this situation the local manager is activated.

FIG. 2B represents a second situation of operation of the method of activation of the local manager 15 in which the user initiates the provision of a subscriber profile via the interface 13 of the electronic device 1, for example a profile received from an operator via the communication means 11 or 12. The situation corresponds to a first mode of detection of a local management mode by detection of provision of a profile coming from the interface 13. The activation agent 16 authorizes the local manager 15 to process the local configuration requests 101.

In a step 217, the interface 13 initiates in the remote server 20 and via the communication means 11 or 12 a request for provisioning a subscriber profile. The remote server 20 transmits a profile installation script, after which the interface 13 receive the installation script via the communication means 11 or 12, and in a step 218 the interface 13 triggers the provisioning to the interface 17 of the secure module 14. During this phase the provisioning can be encrypted in accordance with an encryption protocol executed for a data communication bus via cable between the interface 13 of the electronic device 1 and the interface 17 of the secure module 14. It will be noted that the provisioning request is a local command of "Download Profile" type that is directed directly to the interface 17. In a step 219, the interface 17 processes the script for installation of the profile. It will be noted that the request for provision of a profile is not subject to the control of authorization or prohibition of processing by the local manager 15. It can be envisaged that the interface 13 operates decryption of the installation script on reception if it is received encrypted before transmission to the interface 17 of the secure module.

In parallel with this, the detection means 161 of the activation agent 16 execute a step 221 of detection of a local management mode for the provided profile. In this embodiment, the detection means 161 on request or on reception of a notification from the interface 17 are informed that the profile has been provided via the first interface 13 to determine the result of the detection. To be more precise, the absence of decryption operations (for example SCP80, SCP81) in the context of a secure transport protocol for a radiofrequency communication network, for example the mobile telephone communication network, is detected by the detection means 161 and determines that the result of the detection indicates a local management mode. The activation agent 16 is informed that the profile has been provisioned locally and therefore detects the local profile management mode. Exchanges 220 of information take place between the interface 17 and the activation agent 16 in order to perform the detection and to determine the result of the detection.

In this situation, the activation agent 16 detects local provisioning of the profile 18 and in a step 222 sends an instruction to authorize processing of the local configuration requests to the local manager 15 of the secure module 14. In a step 223, the local manager 15 is authorized to transmit the local configuration requests 101 to the second interface 17.

After this, in a step 224, the user requests activation of the profile via the human-machine interface 10 of the electronic device 1. In a step 225, this request is transmitted to the interface 13 that generates the local request for activation of the profile in a step 226. In a step 227, the local activation request is transmitted to the local manager 15 and in a step 228 is forwarded to the interface 17 for execution.

It can be envisaged that during the step 221 the activation agent 16 detects an instruction for partial authorization of the local requests, for example an instruction for authorization of profile activation and deactivation requests and an instruction for prohibiting requests for deletion of a profile. In the step 222, the instruction to the local manager 15 of the secure module 14 authorizing processing of local configuration requests then configures partial authorization of the local requests, for example authorization of requests for activation/deactivation of a profile and prohibition of requests for deletion of the profile.

Figure 3:
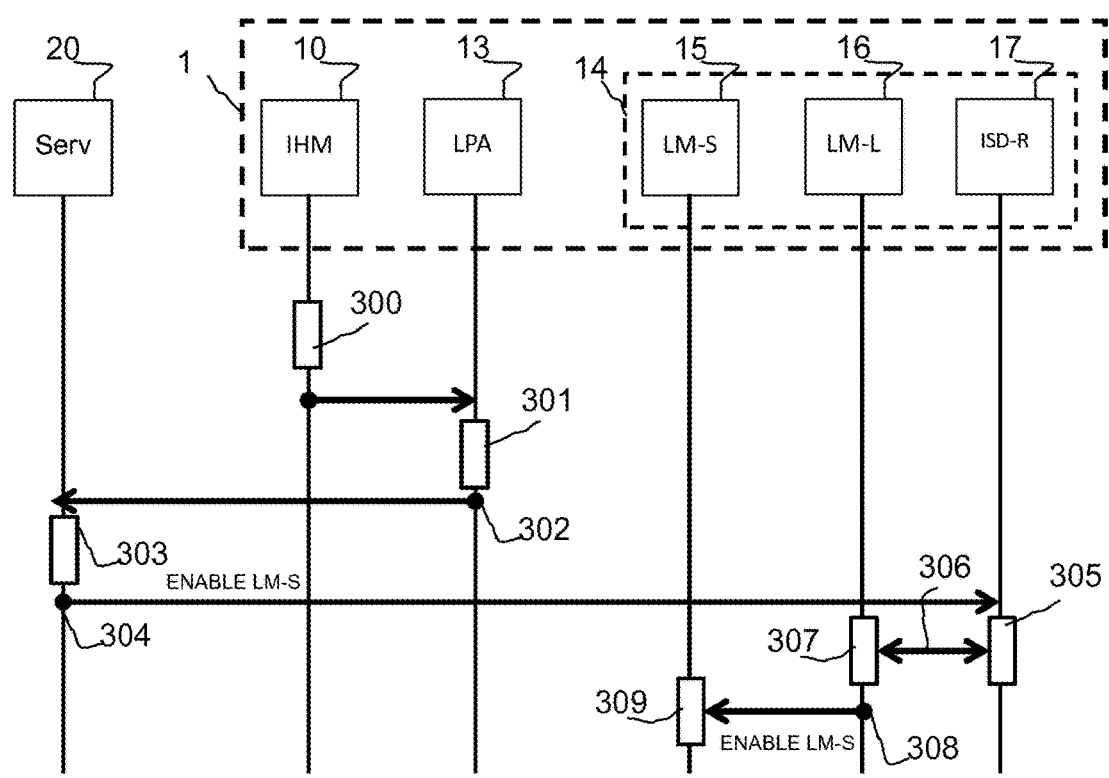
FIG. 3 represents a third variant of the activation method of the local manager of the secure module according to the invention, the local management mode being triggered by the detection of an activation instruction coming from the remote server.

FIG. 3 represents the second detection mode of the local profile management mode. This situation corresponds for example to the insertion of the secure module in a new electronic device 1. The secure module 14 is compatible with a local management mode, i.e. is able to receive local requests for configuration of the profile. In a step 301 the interface 13 generates a notification to the server 20 of the presence of means for executing a local management mode in the electronic device. At this stage of the situation, the activation agent 16 of the secure module 14 prohibits the local manager 15 from processing the local requests 101. In a variant, in a previous step 300, the user initiates a request for activation of the local management mode via the human-machine interface 11 and the interface 13.

After this, in a step 302, the interface 13 transmits to the server via the communication means 11 or the communication means 12 a notification for activation of the local management mode. The notification is preferably encrypted by an encryption algorithm in cooperation with the remote server. In a step 303, the remote server 20 generates an instruction for activation of the local profile management mode and then in a step 304 operates its transmission to the interface 17 by secure communication over the mobile communication network. The instruction to activate the local management mode is therefore secure.

The interface 17 receives the instruction for activation of the local management mode and executes the command in the step 305 and then in a step 306 transmits an instruction for activation of the local management mode to the activation agent 16. In order to determine the result of the detection the method then comprises a step 307 of verification by the detection means 161 of reception of the instruction for activation of the local profile management mode coming from the remote server 20. The result of the detection indicates that the local management mode is authorized. In a step 308, an instruction for authorization of the local management mode is transmitted to the local manager 15. The local configuration requests 101 are then authorized in a step 309.

It can be envisaged that the electronic device operates the reverse process corresponding to deactivation of the local management mode by means of a deactivation instruction coming from the remote server 20. In this situation, the detection means 161 determine the result of the detection that indicates deactivation of the local management mode. After this, the activation agent 16 prohibits the local manager 15 from processing the local requests.

Figure 4:
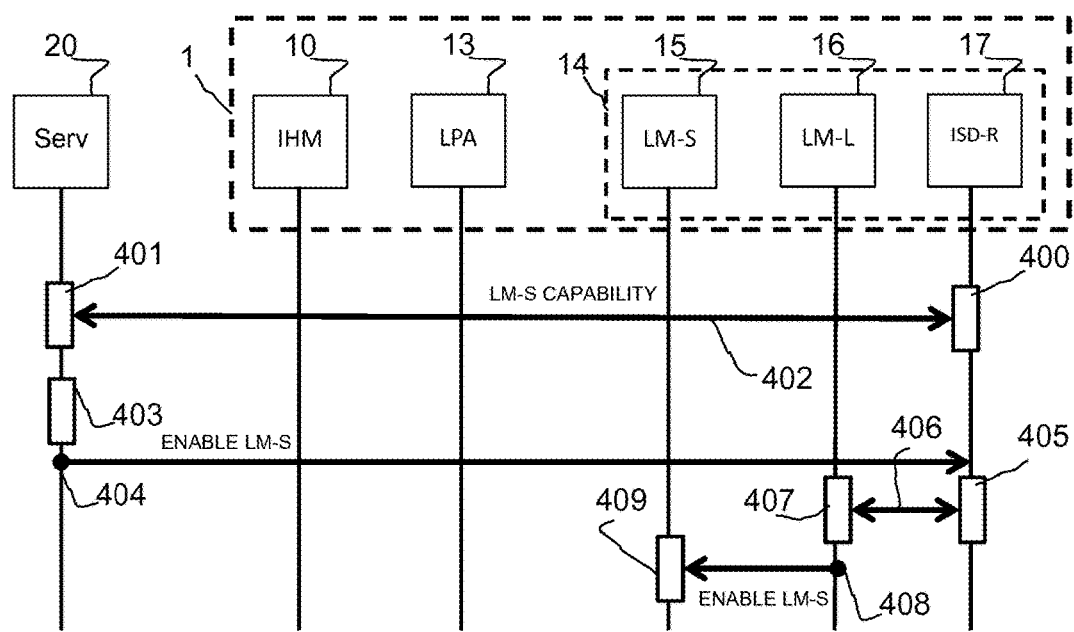
FIG. 4 represents a fourth variant of the activation method of the local manager of the secure module according to the invention, the local management mode being triggered by reading the status of a parameter from the service table of the profile.

FIG. 4 represents a third embodiment for the activation of the local management mode. It is assumed that the secure module 14 is connected with the remote server 20 via a mobile network communication. For example, in this situation it is a question of the first authentication of the secure module to the remote server. The secure module 14 is already provisioned with a subscriber profile.

In a step 400, the interface 17 generates a notification of compatibility with the local management mode, for example by reporting the status of a parameter from the service table of the profile. The parameter from the service table is a flag or information indicating the compatibility of the profile with a local management mode. In a step 402, exchanges take place between the interface 17 and the remote server 20 via the secure communication of the communication network. In a step 401, the remote server is informed of the compatibility of the secure mode with the local management mode.

In a variant, in the step 401, the remote server 20 interrogates the interface 17 to determine the compatibility of the secure module 14 with the local management mode. In the step 400, the interface 17 proceeds to read the parameter from the service table of the profile.

In a step 403, the remote server 20 generates an instruction for activation of the local profile management mode and then in a step 404 operates its transmission to the interface 17 via a secure communication of the mobile communication network. The instruction for activation of the local management mode is therefore secure.

The interface 17 receives the instruction for activation of the local management mode and executes the command in a step 405 and then in a step 406 transmits an instruction for activation of the local management mode to the activation agent 16. In order to determine the result of the detection the method then comprises a step 407 of verification by the detection means 161 of the reception of the instruction for activation of the local profile management mode coming from the remote server 20. The result of the detection indicates that the local management mode is authorized. In a step 408, an instruction for authorization of the local management mode is transmitted to the local manager 15. The local configuration requests 101 are then authorized in a step 409.

Of course, there is provision for all the variant embodiments of the method for activation of the local manager 15 to comprise a step of detection of an instruction for partial authorization of local requests, for example an instruction for authorization of requests for activation and deactivation of the profile and an instruction for prohibition of requests for deletion of a profile. The instruction to the local manager 15 of the secure module 14 for authorization of processing of local configuration requests then configures partial authorization of local requests, for example authorization of requests for activation/deactivation of a profile and prohibition of requests for deletion of the profile.

The invention secures the activation of the local management mode using various detection modes executed by the activation agent 16 that depend on secure communication, in particular by the detection of a secure radiofrequency transport protocol between the secure module and a remote server or the detection of an activation command coming from the remote server. The remote server therefore retains control over the activation and deactivation of the local management mode.

It will be noted that the electronic device 1 and the secure module 14 each comprise an integrated circuit with a microprocessor and programmable memories for the execution of the software functions necessary for the execution of the method of activation of the local management mode.

The invention claimed is:

1. An electronic device, comprising:
   a secure module configured to host at least one mobile communication network subscriber profile; and
   a first interface that transmits local profile configuration requests to the secure module,
   the secure module including a local manager that receives local profile configuration requests coming from the first interface, and an activation agent that includes detection means for detection of a local profile management mode that authorizes or prohibits processing by the local manager of the local configuration requests as a function of a result of the detection,
   wherein the secure module also includes a second interface that communicates with a remote server for receiving remote profile configuration requests, and
   wherein the detection means includes means for determining at least one secure radiofrequency transport protocol that has been executed by the second interface at a time of provisioning of the profile in order to determine the result of the detection.

2. The device as claimed in claim 1, wherein the detection means also includes means for verifying, at the time of provisioning of the profile, that said provisioning of the profile originates from the first interface in order to determine the result of the detection.

3. The device as claimed in claim 2, wherein the activation agent is configured to prohibit the local manager from processing the local configuration requests if the result of the detection indicates that a radiofrequency secure transport protocol has been detected.

4. The device as claimed in claim 1, wherein the activation agent is configured to prohibit the local manager from processing the local configuration requests if the result of the detection indicates that a radiofrequency secure transport protocol has been detected.

5. The device as claimed in claim 1, wherein the secure radiofrequency transport protocol is of the SCP80 or SCP81 type.

6. The device as claimed in claim 5, wherein the detection means also includes means for verifying that the second interface has received an instruction to activate the local profile management mode coming from the remote server in order to determine the result of the detection.

7. The device as claimed in claim 5, wherein the first interface includes means for notifying the remote server to activate the local profile management mode.

8. The device as claimed in claim 1, wherein the detection means also includes means for verifying that the second interface has received an instruction to activate the local profile management mode coming from the remote server in order to determine the result of the detection.

9. The device as claimed in claim 1, wherein the first interface includes means for notifying the remote server to activate the local profile management mode.

10. The device as claimed in claim 1, wherein the activation agent also includes means for authorizing and/or prohibiting the local manager processing some or all of the local configuration requests coming from the first interface.

11. The device as claimed in claim 1, wherein the local configuration requests are requests for activation of the subscriber profile, requests for deactivation of the subscriber profile, and requests for deletion of the subscriber profile.

12. A method of activation of a local management mode of requests for configuration of a subscriber profile for an electronic device that includes a secure module adapted to host at least one subscriber profile, said method comprising:
a detection step of detecting a local profile management mode by detection means of an activation agent of the secure module, followed by a process authorization step of either authorizing or prohibiting a local manager of the secure module processing local configuration requests coming from a first interface of the electronic device as a function of the result of the detection,
wherein the detection step includes determining at least one secure radiofrequency transport protocol that has been executed by a second interface of the secure module in order to determine the result of the detection.

13. The method as claimed in claim 12, wherein the detection step also includes verifying that, at the time of provisioning of the profile, said provisioning of the profile originates from the first interface in order to determine the result of the detection.

14. The method as claimed in claim 12, wherein, upon detecting execution of a secure radiofrequency transport protocol by the second interface, a local profile management mode is not detected and the local manager is prohibited from transmitting the local configuration request.

15. The method as claimed in claim 12, wherein the secure radiofrequency transport protocol is of the SCP80 or SCP81 type.

16. The method as claimed in claim 12, wherein the detection step also includes verifying the reception by the second interface of an instruction for activation of the local profile management mode coming from a remote server in order to determine the result of the detection.

17. The method as claimed in claim 16, further comprising:
a notification step of notifying, by the interface to the remote server, to activate the local profile management mode.

18. The method as claimed in claim 12, further comprising:
a step of either authorizing or prohibiting the local manager processing some or all of the local configuration requests coming from the first interface.

19. The method as claimed in claim 12, wherein the local configuration requests are requests for activation of the subscriber profile, requests for deactivation of the subscriber profile, and requests for deletion of the subscriber profile.

20. A non-transitory computer-readable medium on which is stored code that is executable by an electronic device equipped with a secure module for hosting at least one mobile communication network subscriber profile, the code, upon execution by the electronic device, causing the electronic device to implement the method as claimed in claim 12.

* * * * *